March 6, 1945.  J. H. EDWARDS  2,370,784
WEIGHT MEASURING AND CALIBRATING DEVICE
Filed May 1, 1941

INVENTOR.
JAMES H. EDWARDS.
BY
ATTORNEY.

Patented Mar. 6, 1945

2,370,784

UNITED STATES PATENT OFFICE 2,370,784

WEIGHT MEASURING AND CALIBRATING DEVICE

James H. Edwards, Evanston, Ill.

Application May 1, 1941, Serial No. 391,271

12 Claims. (Cl. 265—27)

This invention relates to weighing and recording devices which are particularly adaptable to weighing things of great weight, such as freight cars, locomotives, highway trucks, cable strain, and equivalent forces such as brake shoe pressures and the like. This application relates to the general class of weighing devices shown and described in my United States Letters Patent No. 2,195,451 and my copending applications Serial Number 386,566 and filed April 2, 1941, and application for reissue of Patent No. 2,195,451 Serial Number 386,567 and filed April 2, 1941.

It contemplates more especially an improved and simplified apparatus for measuring extremely large static loads or forces that are not readily determined with simple weighing or measuring instrumentalities of standard construction. More important, however, is the simplification of a weighing apparatus to dispense with the necessity of large, cumbersome, and exceedingly expensive weighing scales that heretofore have been employed in a highly limited way in railroad and other common carrier terminals.

Railway locomotives very often become what are called "hard riders" due to the lack of proper distribution of weight upon the various wheels of the locomotive and so far as I am aware, there is no simple and economical way of determining the weight on the various wheels of a locomotive so that the distribution of weight may be properly adjusted. There is a need for a simple and economical device for determining the weight of highway trucks.

One object of the present invention is to simplify the construction and improve the operation of devices of the character mentioned.

Another object is to provide an improved device for weighing exceedingly heavy apparatus without requiring expensive weighing equipment.

Still another object is to provide an improved and less expensive testing apparatus of the class described which is sufficiently accurate for the purpose of determining the load on highway truck or locomotive wheels.

A further object is to provide an improved and simplified wheel guiding member serving as a confining medium for a test piece of predetermined hardness and a penetrator accurately transferring the load thereto.

A still further object is to provide an improved and simplified wheel guiding member serving as a confining medium for a test piece of predetermined hardness and a spherically-shaped penetrator for accurately transferring the load thereto.

Still a further object is to provide a more simple and less expensive weight registering disc and penetrator confining wheel guide for directing the load in a manner to accurately register the weight thereof.

Other objects and advantages will appear from the following description of illustrative embodiments of the present invention.

Figures 1, 2:
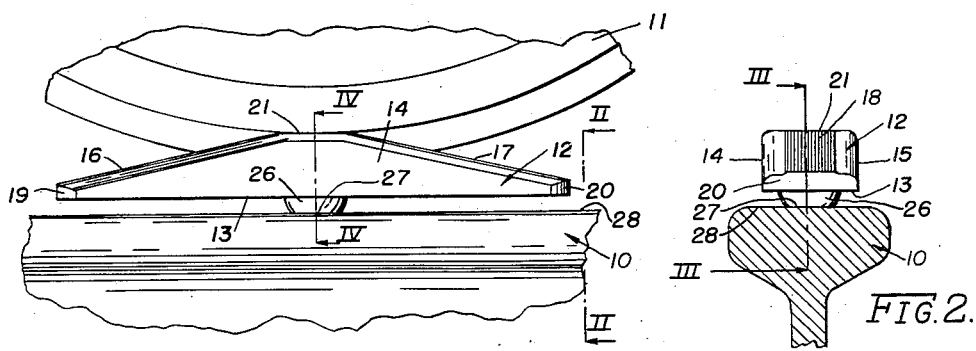
Figure 1 is a side view in elevation of a measuring device shown disposed between a wheel and a rail to accurately transfer the weight to a test piece of predetermined hardness in accordance with the teachings of the present invention.
Figure 2 is a sectional view taken substantially along line II—II of Figure 1.
Figure 4:
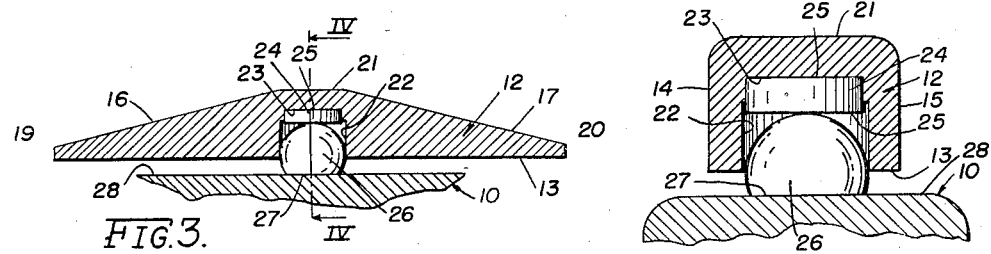
Figure 4 is a fragmentary sectional view taken substantially along line IV—IV of Figures 1 and 3.
Figure 3:
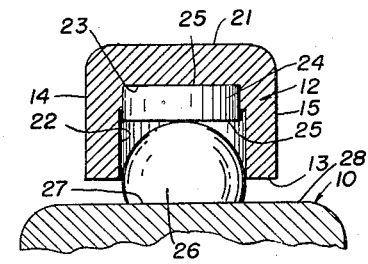
Figure 3 is a fragmentary sectional view taken substantially along line III—III of Figure 2.

The structure selected for illustration is shown in association with a standard rail 10 which normally serves to guide and support a wheel 11 of a locomotive, highway truck or other device to be weighed. It should be appreciated that the application of the weighing apparatus is not limited to the application of the wheel 11, since the teachings of the invention may be utilized for measuring brake shoe pressures and similar forces either in connection with locomotives or other implements. In order to measure the load of an apparatus or any part thereof, there is illustrated the wheel 11 which can be guided for support by a guide housing body 12 comprising, in this instance, a substantially elongated member having a rectangular bottom or base 13 with parallel upstanding sides 14 and 15 that merge with upwardly converging inclined tread surfaces 16 and 17.

The tread surfaces 16 and 17 may be provided with any suitable roughened surface impression such as a slightly upraised knurled shoulder 18 to impart more traction to another element such as the wheel 11 in its traversing movement thereover. As shown, the upwardly inclined traction surfaces 16—17 merge with well-rounded edges 19—20 proximate to the base 13, the rounded edges 19—20 being of sufficient thinness to permit the wheel 11 to approach and traverse thereover without offering any appreciable obstruction thereto. The converging edges of the inclined surfaces 16—17 merge with a horizontal portion or top surface 21 that is only of sufficient length to support part of an apparatus such as a wheel 11 directly in vertical alignment with its axis and to insure that the entire weight will be concentrated along a line equi-distant between the base edges 19—20 of the guide housing 12.

The sloping surfaces 16—17 enable the wheel 11 to ride up slightly on the guide housing body 12 to assume a position on the horizontal portion 21 and concentrate the load along the medial portion thereof. The medial portion of the guide housing body 12 is provided, in this instance, with a cylindrical bore 22 of a diameter approximating the size of the horizontal portion and load bearing surface 21. The bore 22 extends downwardly to communicate with the base 13 and its upper end presents a circular recess 23 of somewhat smaller diameter than the bore 22, the bore 22 and circular recess 23 being in eccentric axial or other relation and are accurately measured to provide an axis and corresponding walls directly normal to the horizontal top bearing surface 21.

A circular test piece such as a circular disc 24 of predetermined hardness is shaped to be received in the circular recess 23 without allowing any more room therein than is necessary to freely insert and remove the test piece 24 therefrom. The test piece 24 is of slightly greater depth or thickness than the circular recess 23 in order that one of its flat surfaces 25 will project within the bore 22 for direct contact with the arcuate surface of a spherical penetrator 26 therewith. The penetrator 26 is, in this instance, prepared from a specially true ball bearing of much greater hardness than the test piece 24 so that a portion of its substantially spherical surface will be in direct contact over a restricted area with the test disc 24.

To this end, the penetrator 26 is of originally spherical configuration and is accurately cut below the diameter thereof for presenting a flat surface 27 for contact with the traction surface 28 of the rail 10. The penetrator 26 is prepared from specially true ball bearing that is of a diameter substantially equivalent to the bore 22 so that the flat surface 27 provided below the diameter will extend or project from the bore 22 and support the guide housing body 12 so that its base 13 is upraised or spaced from the traction surface 28 of the rail 10 for a distance somewhat greater than the extent of penetration in the test disc 24.

The adaptability of the test disc 24 and the size of the penetrator 26 should be such that with the greatest load to be determined therewith, the extent of penetration will not exceed the distance between the base 13 of the guide housing body 12 and the traction surface 28 of the rail 10 so that the full load of the wheel 11 or other device to be weighed may be supported by the penetrator 26 and the confronting test disc 24 which is confined within the guide housing body 12.

As the wheel 11 rides up one or the other of the inclined surfaces 16 or 17, the guide housing body 12 will tilt so that its extremity 19 or 20 will touch the traction surface 28 of the rail 10. The guide housing body 12 will maintain its tilted position until the wheel 11 rides up to and rests upon the horizontal load bearing surface 21 whereupon the guide housing body 12 will again assume a horizontal position. During this tilting treatment, the penetrator 26 by virtue of its contacting configuration with the test disc 24 will contact therewith and the impression imparted to the surface 25 finally determines the weight sustained by the penetrator 26 and its confronting disc 24.

The arcuate surface of the substantially spherical penetrator 26 imparts a correspondingly shaped depression 29 in the test piece or disc 24 which may be calibrated in any predetermined hardness and measured to enable the determination of the pounds or tons depending upon the capacity. In the present embodiment, a depth gauge 30 is shown as one method of determining the load from the extent of the depression 29 in the test piece 24. The depth gauge 30 is of standard construction and its calibrations 31 on its dial 32 may be interpolated in pounds or tons. Other measuring instrumentalities may be utilized in lieu of the depth gauge 30 depending upon the dictates of commercial practice.

Figures 7, 8:
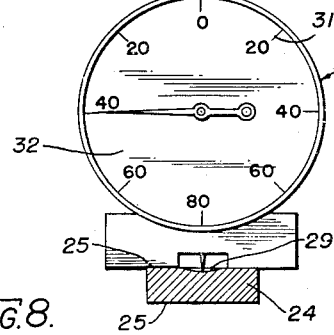
Figure 7 is a sectional view in elevation similar to Figure 3 of a still further modified embodiment of the present invention.
Figure 8 is a front view in elevation of a depth gauge shown in its application to a disc, the latter being shown in section to clarify the illustration.

In the modified embodiment of the invention illustrated in Figure 7, a guide housing body 12' has its substantially flat elongated base 13' interrupted with upwardly inclined end surfaces 33 and 34. The upwardly inclined end surfaces 33—34 of the base 13' are oppositely inclined to the converging top surfaces 16'—17' at a substantially lesser pitch. The more gradually inclined base ends 33—34 merge with rounded extremities 19'—20' that not only reduce the height from the very limited or negligible obstruction offered by the normal extremities 19—20 embodied in the preferred embodiment shown in Figure 1, but also to afford tilting responsive to the application of a load as it rides up the inclined surfaces 16' or 17'.

This tilting of the guide housing body 12' renders possible even a more gradual application of the load and minimizes all possible impact even of the most negligible magnitude in that the guide housing body 12' will initially rest on either the inclined base ends 33 or 34 in the medial portion supported by the surface of the penetrator 26' without creating any impression in the test piece 24'. This tilted position is retained until the load reaches the horizontal medial bearing surfaces 21' whereupon the test piece 24' is penetrated by the member 26' commensurate with the extent of the load.

Figure 6:
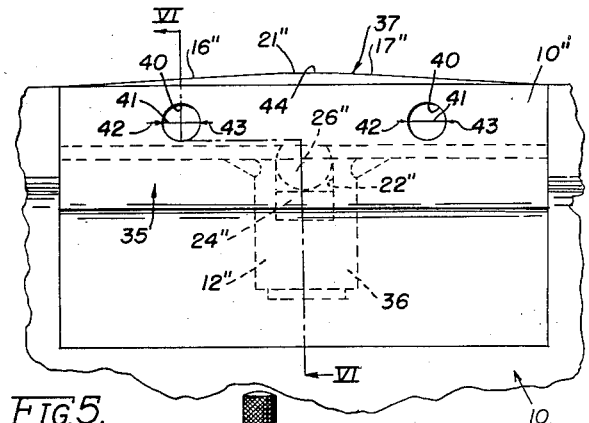
Figure 6 is a sectional view taken substantially alone line VI—VI of Figure 5.
Figure 5:
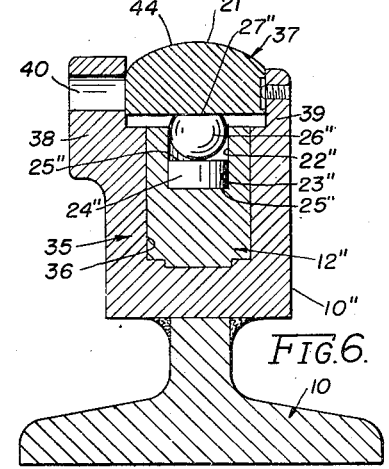
Figure 5 is a side view in elevation of a modified embodiment of the present invention showing its application in permanent association with a rail that has been specially prepared for the permanent assembled association of the testing apparatus thereto.

In the still further modified embodiment shown in Figure 6, the rail 10 is provided with a special rail section 10'' that is complemental thereto and extends in line therewith. The rail section 10'' consists of a substantially U-shaped portion 35 defining a chamber 36 to receive a guide housing body 12''. The bore 22'' extends vertically downward in the member 12'' to receive the circular test piece 24'' with a spherical penetrator 26'' disposed therein so that its flat surface 27'' will extend upwardly to receive a load bearing member 37 thereon.

The load bearing member 37 is received between confronting side flanges 38 and 39 comprising part of a substantially U-shaped portion 35 of the rail section 10″, thus preventing accidental displacement of said member. It should be noted that the side flange 38 is somewhat thicker and higher than the opposite side flange 39 in order to present one or more viewing apertures 40, in this instance two, that are sufficiently large to enable the visual observation of horizontal guide lines 41 inscribed on the load bearing member 37 so as to normally align with the horizontal diameter of the viewing apertures 40 when the test piece 24″ and penetrator 26″ are disposed between the body member 12″ and the load bearing member 37 before the application of any load thereto.

To this end, the side flange 38 has opposed arrow indicators 42 and 43 in horizontal alignment along the horizontal diametrical line of the apertures 40 to normally align with the guide lines 41 inscribed on the load bearing member 37. This will show that the load bearing member 37 is in its normal position with the test piece 24″ and penetrator 26″ in position preparatory to receiving and registering a load of any predetermined amount therein. If the indicator lines 41 on the load bearing surface 37 are below the arrow lines 42—43, then it is clearly apparent that either the body member 12″ has not been provided with the test piece 24″ and penetrator 26″ or the load has already been measured therewith.

This arrangement affords a smooth impactless displacement of the full load on the load bearing member 37 which constitutes an elongated plate having a substantially round crown 44 with upwardly converging inclined tread surfaces 16″—17″ merging with the horizontal load bearing surface 21″ along the medial portion of the supporting member 37. It should be observed that the lower extreme edges of the oppositely inclined converging tread surfaces 16″—17″ are horizontally aligned with the rail 10 so that there is no obstruction afforded by the extremities thereof when the wheels or other load rides up either the inclined tread surface 16″ or 17″. The modification described and illustrated in connection with Figure 7 can also be embodied on the load bearing member 37 should commercial practice so dictate.

Various changes may be made in the embodiments of the invention herein specifically described without departing from the invention or sacrificing any of the features or advantages thereof, and nothing herein shall be construed as limitations upon the invention, its concept or structural embodiment as to the whole or any part thereof except as defined in the appended claims.

I claim:

1. A static weight measuring device for determining large static forces or weights comprising a body member having a bore therein, an unattached test piece loosely disposed in the bore of said body member, said body member having a loading surface overlying said bore and a penetrator member having a substantially spherical test piece contacting surface disposed in said bore in confronting relation to said test piece, said penetrator member having a flat bearing surface projecting from the bore of said body member whereby a dead weight loaded to said body member and onto said loading surface thereof will be transmitted to said penetrator member to impart without impact a depression to said test piece in proportion to the magnitude of said dead weight.

2. A static weight measuring device for determining large static weights comprising a body member to initially receive the weights to be measured, said body member having a bore therein, an unattached test piece loosely disposed in the bore of said body member, said body member having a flat loading surface overlying said bore, and a substantially spheroidal penetrator member having a flat supporting surface, said penetrator member flat supporting surface being disposed opposite said test piece contacting surface to project from the bore of said body member with the spheroidal portion thereof in confronting relation to said test piece in the body member bore whereby a dead weight loaded to said body member and onto said flat loading surface will be transmitted to said penetrator member to impart without impact a depression to said test piece in proportion to the magnitude of said dead weight.

3. A static weight measuring device for determining the magnitude of large static weights comprising a body member to initially receive the forces or weights to be measured, said body member having a bore therein, a test piece loosely disposed in said bore, a penetrator member projecting from the bore of said body member and having a substantially spherical test piece contacting surface in the bore of said body member in confronting relation to said test piece, said body member having inclined traction surfaces to enable the gradual loading of a large dead weight from said body member to said penetrator member without impact, whereby a dead weight loaded along said inclined traction surface on to said body member will be transmitted to said penetrator member to impart without impact a depression to said test piece in proportion to the magnitude of said dead weight.

4. A static weight measuring device comprising a body member having a bore therein, a test piece loosely associated with said bore, a substantially spheroidal penetrator member having a flat supporting surface, said penetrator member being disposed in said bore with the flat supporting surface projecting outwardly therefrom, said flat supporting surface being opposite a spherical test piece contacting surface disposed in confronting relation to said test piece, said body member having inclined traction surfaces thereon to enable the gradual loading of dead weight from said body member to the flat supporting surface of said penetrator member whereby the weight loaded from said body and onto said penetrator member will impart a depression to said test piece in proportion to the magnitude of said dead weight.

5. A static weight measuring device comprising a body member having a bore therein, a flat test piece in said bore, a penetrator member having a substantially spherical test piece contacting surface disposed in said body member in confronting relation to said test piece, said penetrator member having a portion projecting from the bore of said body member, said body member having inclined traction surfaces to enable the gradual loading of a dead weight from said body member to the projecting surface of said penetrator member without impact, and a load bearing surface on said body member between said inclined traction surfaces and aligned with said penetrator member, whereby a force loaded from said body member and onto said penetrator member will impart a depression to said test piece in proportion to the magnitude of said dead weight.

6. A static weight measuring device comprising a body member having a recess therein, a test piece in said recess, a penetrator member having a flat load supporting surface projecting from said recess, said flat penetrator member supporting surface being disposed opposite a curved test piece contacting surface in confronting relation to said test piece, said body member having inclined traction surfaces thereon to enable the gradual loading of a dead weight from said body member to said penetrator member without impact, said body member having a load bearing surface between said inclined traction surfaces and aligned with said penetrator member, whereby a force loaded from said body member onto said penetrator member will impart a depression to said test piece member in proportion to the magnitude of said dead weight.

7. A static weight measuring device comprising a body member having a flat supporting base, there being a recess in said body member for receiving a test piece therein, a test piece loosely associated with said recess, a penetrator member projecting from said recess and having a substantially spherical test piece contacting surface disposed in the recess of said body member in confronting relation to said test piece, said body member having inclined traction surfaces thereon to enable the gradual loading of a dead weight from said body member to said penetrator member without impact, said body member having a load bearing surface between said inclined traction surfaces in alignment with said penetrator member, said load bearing surface being substantially parallel to said body member base, whereby a dead weight loaded from said body and on to said penetrator member will impart a depression to said test piece in proportion to the magnitude of said dead weight.

8. A static weight measuring device comprising a body member having a bore therein, there being a somewhat smaller recess at the inward end of said bore, a test piece loosely received in said recess through said bore, a curved penetrator member having a flat supporting surface, said penetrator member flat supporting surface being disposed opposite a curved test piece contacting surface extending into the bore of said body member in confronting relation to said test piece, said body member having inclined traction surfaces thereon to enable the gradual loading of a dead weight from said body member to the flat supporting surface of said penetrator member without impact, a flat base on said body member, said body member having a load bearing surface between said inclined traction surfaces in alignment with the bore provided in said body member, said load bearing surface being substantially parallel to said body member base, whereby a dead weight loaded from said body member and on to said penetrator member will impart a depression to said test piece in proportion to the magnitude of said dead weight.

9. A static weight measuring device comprising a body member having a flat supporting base, there being a bore in said body member to communicate with said flat base, a test piece loosely received in said bore, a penetrator member having a substantially spherical test piece contacting surface extending into the bore of said body member in confronting relation to said test piece, said body member having inclined traction surfaces thereon to enable the gradual loading of a dead weight from said body member to said penetrator member without impact, said body member having a load bearing surface between said inclined traction surfaces, said load bearing surface being substantially parallel to said body member base, whereby a dead weight loaded from said body and on to said penetrator member will impart a depression to said test piece in proportion to the magnitude of said dead weight.

10. A static weight measuring device comprising a body having a bore therein, a circular test piece having flat parallel surfaces loosely disposed in the bore of said body member, a substantially spheroidal penetrator member having a flat supporting surface, said penetrator member flat supporting surface being disposed outside of the bore of said body member while the spheroidal portion of said penetrator member is within the bore of said body member in confronting relation to said test piece, a flat supporting base on said body member, tapered end regions on said flat supporting base, said body member having inclined traction surfaces thereon opposite to said flat base to enable the gradual loading of a dead weight from said body member to said penetrator member without impact, said body member having a load bearing surface between said inclined traction surfaces in alignment with said bore that communicates with said base, said load bearing surface being substantially parallel to said body member base, whereby a dead weight loaded from said body and on to said penetrator member will impart a depression to said test piece in proportion to the magnitude of said dead weight.

11. In combination with a traction member, of a static force measuring device for determining large static weights comprising a body member having a bore therein, an unattached test piece disposed in said bore, a penetrator member disposed in said bore, said penetrator member having an arcuate portion adapted to contact said test piece and having a portion projecting beyond said bore, said traction member confronting said body member and engaged with the projecting portion of said penetrator member, said penetrator member providing a fulcrum for a relative rocking movement between said body member and said traction member, whereby a dead weight loaded from said body member and on to said penetrator member will impart a depression to said test piece in proportion to the magnitude of said dead weight.

12. In combination with a traction member, of a static weight measuring device comprising a body member having a bore therein, an unattached test piece disposed in said bore, a penetrator member loosely received in said bore, said penetrator member having an arcuate portion adapted to contact said test piece and having an opposite flat portion projecting from said bore beyond said body member, said traction member having a flat surface confronting said body member in normally spaced relation thereto and engaged with the flat projecting portion of said penetrator member; said penetrator member providing a fulcrum for a relative rocking movement between said body and traction members, whereby a force loaded from said body member and on to said penetrator member causes said penetrator member to impart a depression to said test piece in proportion to the magnitude of said dead weight.

JAMES H. EDWARDS.